No. 774,220. PATENTED NOV. 8, 1904.
C. WILLIAMS.
JOURNAL BOX.
APPLICATION FILED JULY 5, 1904.
NO MODEL. 2 SHEETS—SHEET 2.
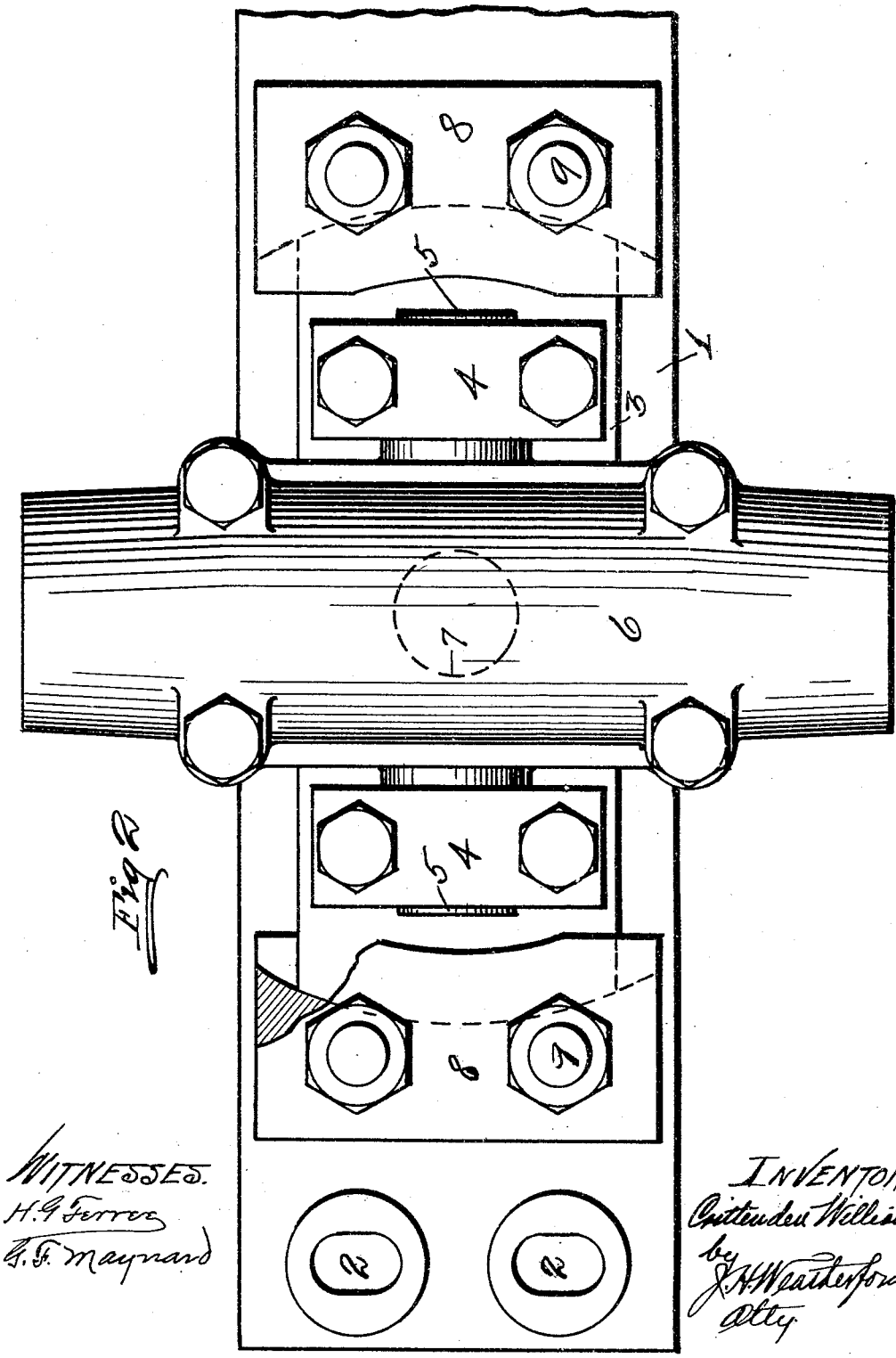

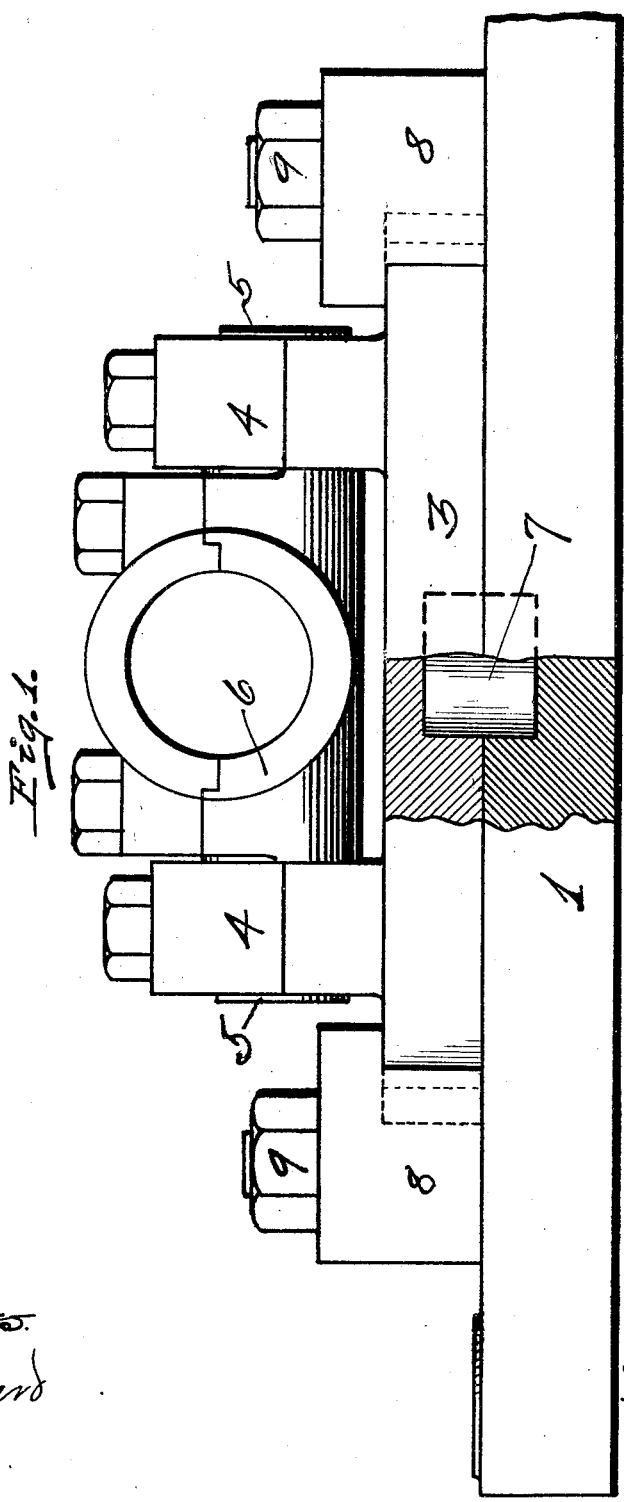

No. 774,220. Patented November 8, 1904.

UNITED STATES PATENT OFFICE.

CRITTINDEN WILLIAMS, OF ARLINGTON, TENNESSEE.

JOURNAL-BOX.

SPECIFICATION forming part of Letters Patent No. 774,220, dated November 8, 1904.

Application filed July 5, 1904. Serial No. 215,290. (No model.)

*To all whom it may concern:*

Be it known that I, CRITTINDEN WILLIAMS, a citizen of the United States, residing at Arlington, Shelby county, State of Tennessee, have invented certain new and useful Improvements in Journal-Boxes, of which the following is a specification.

My invention relates to certain new and useful improvements in journal-boxes, and has especial reference to improvements in mounting the box so that it may adjust itself to conform to the alinement of the shaft.

The object of my invention is to mount a journal-box so that it may automatically conform to the alinement of the shaft, and thereby prevent distortion of the shaft. I accomplish this object as will be more fully hereinafter set forth in the drawings, specification, and claims.

In the drawings, Figure 1 is an end elevation of my journal-box. Fig. 2 is a plan view of same.

Referring now to the drawings, in which numerals indicate the parts, 1 is a foundation-plate provided with holes 2, so that it may be bolted down to its foundation.

3 is a base which rests on the foundation 1 and which carries standards 4, in which are mounted trunnions 5, which extend out from the journal-box 6. Immediately in the center of the foundation-plate is a pin 7, on which the base 3 is journaled and turns, the pin preventing lateral or longitudinal movement of the base.

On the foundation-plate 1 at each end of the base 3 are clamps 8, which are fastened to the plate 1 by bolts 9. These clamps may be made to tightly grip the ends of the base 3, but preferably are so made that they hold the said base securely without binding and permit a rotary motion of same around the pin 7.

The trunnions 5, revolving in the bearing 4, allow motion of the box in the plane of the pin 7, and therefore at right angles to the plane of motion around the pin. By these two motions I thus secure freedom for the box to move in any direction, and therefore prevent any binding of the shaft which might be caused by same being bent out of line. The bearing 4 is clamped on the trunnion sufficiently tight to hold it firmly and yet loose enough to permit free movement of said trunnions.

Having now fully described my invention, what I claim, and desire to secure by Letters Patent in the United States, is—

1. The combination with a foundation-plate, a base mounted on said plate, and bearings carried by said base, of a journal-box having trunnions extending outward therefrom and mounted in said bearings, substantially as and for the purposes described.

2. The combination with a foundation-plate, a pin in the center of said plate, a base mounted on said plate and journaled on said pin, and bearings extending upward from said base, of a journal-box, having trunnions extending outward therefrom and mounted in said bearings, substantially as and for the purposes set forth.

3. The combination with a foundation-plate, a pin extended upward from said plate, a base resting on said plate and journaled on said pin, clamps holding said base to said plate and bearings extending upward from said base, of a journal-box, having trunnions extended outward therefrom and mounted in said bearing, substantially as and for the purposes set forth.

In testimony whereof I have signed my name to this specification in the presence of two subscribing witnesses.

CRITTINDEN WILLIAMS.

Witnesses:
S. Y. WILSON,
R. B. HAYS.